(12) United States Patent
Petrosky

(10) Patent No.: US 8,973,648 B2
(45) Date of Patent: Mar. 10, 2015

(54) TUBESHEET GRIPPING MECHANISM AND METHOD

(71) Applicant: Westinghouse Electric Company LLC, Cranberry Township, PA (US)

(72) Inventor: Lyman J. Petrosky, Latrobe, PA (US)

(73) Assignee: Westinghouse Electric Company LLC, Cransberry Township, PA (US)

( * ) Notice: Subject to any disclaimer, the term of this patent is extended or adjusted under 35 U.S.C. 154(b) by 278 days.

(21) Appl. No.: 13/785,340

(22) Filed: Mar. 5, 2013

(65) Prior Publication Data

US 2013/0299670 A1 Nov. 14, 2013

Related U.S. Application Data

(60) Provisional application No. 61/645,117, filed on May 10, 2012.

(51) Int. Cl.
*F28F 9/22* (2006.01)
*F16M 13/02* (2006.01)
*G21C 17/017* (2006.01)
*G21C 19/20* (2006.01)

(52) U.S. Cl.
CPC ............. *F16M 13/02* (2013.01); *G21C 17/017* (2013.01); *G21C 19/207* (2013.01)

USPC .......................................................... 165/161

(58) Field of Classification Search
USPC ................................................. 165/161, 162
See application file for complete search history.

(56) References Cited

U.S. PATENT DOCUMENTS

| | | | |
|---|---|---|---|
| 3,867,908 A * | 2/1975 | Byerley et al. | 122/32 |
| 4,158,415 A | 6/1979 | Young | |
| 4,168,782 A | 9/1979 | Sturges, Jr. | |
| 4,303,368 A | 12/1981 | Dent et al. | |
| 4,427,317 A | 1/1984 | Wilhelm | |
| 4,643,249 A * | 2/1987 | Grawey | 165/159 |
| 4,653,576 A * | 3/1987 | Lagally | 165/69 |
| 4,709,755 A * | 12/1987 | Gentry et al. | 165/160 |
| 4,728,217 A | 3/1988 | Fink | |
| 4,771,526 A | 9/1988 | Arzenti et al. | |
| 4,901,578 A | 2/1990 | Brill, III | |
| 5,029,388 A * | 7/1991 | Statile | 29/890.031 |
| 5,061,176 A * | 10/1991 | Zafred et al. | 432/5 |
| 7,314,343 B2 | 1/2008 | Hawkins et al. | |

\* cited by examiner

*Primary Examiner* — Gwendolyn W. Baxter
(74) *Attorney, Agent, or Firm* — Richard J. Coldren; Westinghouse Electric Company LLC

(57) ABSTRACT

A tubesheet anchor for suspending a tool from the underside of a heat exchanger tubesheet that inserts one end of two fingers into corresponding openings in the tubesheet and leverages one finger off the other to apply a frictional force to the sides of the tubesheet openings in which the fingers are inserted to clamp the fingers to the tubesheet.

23 Claims, 5 Drawing Sheets

TUBESHEET GRIPPING MECHANISM AND METHOD

CROSS REFERENCE TO RELATED APPLICATION

This application claims priority under 35 U.S.C. §119(e) from Provisional Application Ser. No. 61/645,117, entitled "Simplified Tubesheet Gripping Mechanism," filed May 10, 2012.

BACKGROUND

1. Field

This invention generally concerns robotic systems and is specifically concerned with an improved gripping mechanism for lightweight robotic systems for servicing heat exchanger tubes of a nuclear steam generator.

2. Related Art

In a pressurized water nuclear power electric generating system, the heat generated by the nuclear reaction is absorbed by a primary coolant that circulates through the reactor core and is utilized to generate steam in a heat exchanger commonly referred to as a steam generator. The steam generator typically is an upright cylindrical pressure vessel with hemispherical end sections. A transverse plate called a tubesheet, located at the lower end of the cylindrical section, divides the steam generator into a primary side, which is the lower hemispherical section below the tubesheet, and a secondary side above the tubesheet. A vertical wall bisects the primary side into an inlet section and an outlet section. The tubesheet is a thick carbon steel plate with an array of thousands of holes into which are inserted the ends of U-shaped tubes. One end of each U-shaped tube is inserted into a hole within the tubesheet which communicates with the inlet section of the primary side and the other end is inserted in a hole within the tubesheet which communicates with the outlet section. The primary coolant is introduced under pressure into the inlet section of the primary side, circulates through the U-shaped tube and exits through the outlet section. Water introduced into the secondary side of the steam generator circulates around the U-shaped tubes and is transformed into steam by heat given up by the primary coolant. Typically, there are thousands of small diameter U-shaped tubes which provide a large surface area for heat transfer. The number of tubes in a steam generator range from about 4,000 to 15,000. Some steam generators utilize straight length tubes each about 60 feet long. Most of the steam generators are constructed of U-shaped tubing or long vertical sections with two 90° bends joined by a shorter horizontal length tubing. During plant operation, the high pressure water that flows through the reactor core transports some amount of radioactive particles through the steam generators and some particles become deposited on the interior surface of the tubes. After plant operation, the steam generators become a source of radiation.

Occasionally, during the operation of the steam generator, degradation occurs in some of the tubes. This is undesirable because the primary coolant is radioactive and any leakage of the reactor coolant into the secondary side of the generator contaminates the steam. It is generally not practical, however, to replace degraded tubing, but instead the steam generator is periodically inspected and the affected tubes are plugged at both ends. In view of the thousands of tubes in the steam generator, plugging of a few tubes does not appreciably affect the efficiency of the heat transfer.

Because of the radiation hazard present in steam generators used in a nuclear power utility, the heat exchanger tubes of such steam generators must be, for the most part, remotely serviced to avoid exposing maintenance personnel to potentially harmful radiation. Consequently, a number of robotic systems have been developed for remotely performing repair and maintenance operations on these heat exchanger tubes. These robotic systems typically include some sort of robotic delivery arm in combination with any one of a number of specialized tools designed to be carried by the robotic arm, which are known in the art as "end effectors." Some of the common robotic systems for this task utilize the holes in the tubesheet to anchor the robot via number of camlocks (typically four or more), for example, as shown in U.S. Pat. No. 7,314,343, assigned to the Assignee of this invention. Each charlock consists of a cylindrical arrangement of flexible "fingers" that protrude into a single tube and are expanded by a central cam actuated to engage the tube inner diameter surface. They thereby achieve anchoring from the resulting frictional force of the fingers on the tube inside diameter. This anchoring method is effective, but the problems are that the camlocks are costly, complex devices and they may release unexpectedly if the actuation force is lost.

Accordingly, it is an object of this invention to provide a simpler gripper capable of anchoring a robot to the underside of a tubesheet without the use of camlocks.

It is a further object of this invention to provide a single mechanism that provides both anchoring and rotational alignment.

It is an additional object of this invention to provide such a mechanism that supplies a very high gripping force through a mechanical advantage.

It is a further object of this invention to provide such a mechanism that automatically locks in place and requires no actuation force to stay locked.

It is a further object of this invention to provide such a mechanism that can release and re-grip very quickly.

It is an additional object of this invention to provide such a mechanism that is self-aligning and provides accurate locating.

SUMMARY

These and other objects are achieved by a tool having an actuator for gripping a tubesheet of a heat exchanger having a plurality of heat exchange tubes extending at least partially through thru-holes in the tubesheet, with each of the heat exchange tubes having a central axis extending along a length thereof. The actuator includes a first elongated finger sized to have a first end of the first elongated finger inserted at least partially within a first of the thru-holes within the tubesheet. A second elongated finger is sized to have a first end of the second elongated finger inserted at least partially within a second of the thru-holes in the tubesheet. The second elongated finger is spaced from the first elongated finger to substantially align with the second of the thru-holes when the first elongated finger is substantially aligned with the first of the thru-holes. A tie rod is connected between the first elongated finger and the second elongated finger at a first elevation along the first elongated finger and the second elongated finger that is spaced from the first ends. The connection of the tie rod between the first elongated finger and the second elongated finger is configured to restrain movement at the first elevation of the first elongated finger and the second elongated finger in at least a first of two lateral directions, either toward each other or away from each other. The actuator also includes an actuation arm connected between the first elongated finger and the second elongated finger at a second elevation along the first elongated finger and the second elongated finger that is spaced from the first elevation and spaced from the first ends. The connection of the actuation arm between the first elongated finger and the second elongated finger is configured to move the first elongated finger in at least one of two lateral directions and cant at least one of the first elongated finger and second elongated finger relative to the axis of a corresponding tube or through a hole in which it is designed to be inserted to pressure the one of the first elongated finger and the second elongated finger against an inner wall of the corresponding tube or through a hole and hold that position until the actuation arm is positively released.

In one embodiment, the actuation arm cants both the first elongated finger and the second elongated finger relative to the axis of the corresponding tube or thru-hole in which it is designed to be inserted to pressure the first elongated finger and the second elongated finger against the corresponding tube in which it is inserted. Preferably, the actuation arm toggles between a locked position in which at least one of the first elongated finger and the second elongated finger is canted relative to the axis of the corresponding tube or thru-hole in which it is designed to be inserted and an unlocked position in which the first elongated finger and the second elongated finger are not pressured against the inner wall of the corresponding tube or thru-hole. In another embodiment, both the first elongated finger and the second elongated finger are pressured against the inner wall of the corresponding tube or thru-hole when the actuation arm moves in the at least one of the two lateral directions.

In still another embodiment wherein the first elevation is between the first ends and the second elevation, the tie rod restrains movement of the first elongated finger and the second elongated finger towards each other. In an alternate embodiment, the tie rod restrains movement of the first elongated finger and the second elongated finger away from each other.

In an additional embodiment, the second elevation is between the first ends and the first elevation and the tie rod restrains movement of the first elongated finger and the second elongated finger towards each other. Alternately, the tie rod restrains movement of the first elongated finger and the second elongated finger away from each other.

In a further embodiment the first elongated finger and the second elongated finger are configured to move a distance vertically independent of the actuation arm. Preferably, the actuation arm includes a compensator that is configured to accommodate a variation in spacing of the thru-holes while maintaining an approximately constant clamping force. The compensator may be an air spring, for example.

The invention also contemplates a method of supporting a tool from the underside of a heat exchange tubesheet having a plurality of openings extending through an underside. The method includes the step of inserting a portion of a first finger into a first opening in the underside of the tubesheet and inserting a portion of a second finger into a second opening in the underside of the tubesheet. The method leverages the first finger off the second finger to clamp at least a part of the portion of either the first finger or the second finger that is inserted into the corresponding opening against a wall of the opening and locks the first finger and the second finger in their clamped position.

In one embodiment the method leverages both the first finger and the second finger against the wall of the corresponding opening. Preferably the leveraging step cants either the first finger or the second finger or both relative to an axis of the corresponding opening in which it is inserted. The method also includes the step of suspending the tool from the first and second finger. The method may also include the step of moving the first finger and the second finger in a vertical direction independent of a mechanism for performing the leveraging step. Further, the method may additionally include the step of compensating for a variation in the distance between openings in the underside of the tubesheet while substantially maintaining a constant clamping force.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Occasionally it is necessary to inspect steam generator tubes for surface and volume flaws by using a robot that can position an inspection probe within the tubes to be inspected and support the equipment employed to facilitate the probe's travel through the tube. The invention claimed hereafter and the embodiments thereof described herein provide a simplified anchor for supporting such a robot from the underside of the tubesheet.

Figure 1:
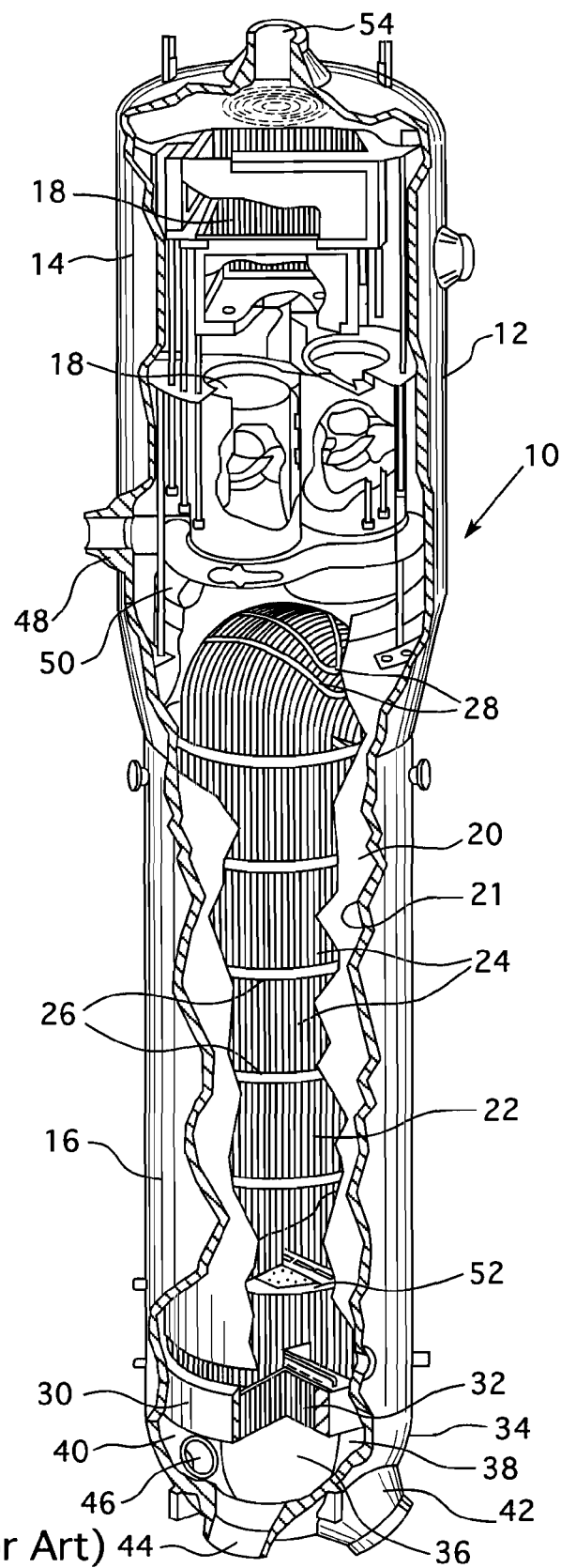
FIG. 1 is a view in perspective and partial vertical section of a steam generator with parts removed in the interest of clarity.

Referring to FIG. 1, a steam generator is referred to generally by reference character 10 and comprises a generally cylindrical outer shell 12 having a cylindrical upper portion 14 and a cylindrical lower portion 16. Disposed in the upper portion 14 is moisture separating means 18 for separating a steam-water mixture so that entrained water is removed from the steam-water mixture. Disposed in lower portion 16 is an inner shell 20 which is closed at its top end except for a plurality of openings disposed in its top end for allowing passage of the steam-water mixture from the inner shell 20 to the moisture separating means 18. Inner shell 20 is open at its bottom end, which inner shell 20 defines an annulus 21 between the inner shell 20 and the lower portion 16 of the outer shell 12. Disposed in the inner shell 20 is a vertical steam generator tube bundle 22 having a plurality of vertical, U-shaped steam generator tubes 24 therein. Disposed at various locations along the length of the tube bundle 22 are a plurality of horizontal circular tube support plates 26, having holes therein for receiving each tube of the tube bundle 22, for laterally supporting the tubes and for reducing flow-induced vibration in the tubes. Additional support for the tubes in the tube bundle 22 is provided in the U-bend region of the tube bundle 22 by a plurality of anti-vibration bars 28.

Still referring to FIG. 1, disposed in a lower portion 16 of the outer shell 12, below a bottom most support plate 52 is a horizontal, circular tubesheet 30 having a plurality of vertical apertures 32 therethrough for receiving the ends of the tubes of the tube bundle 22, which ends of the tubes extend a predetermined distance through the apertures 32. Tubesheet 30 is sealingly attached, which may be by welding, around a circumferential edge to a hemispherical channel head 34. Disposed in channel head 34 is a vertical, semi-circular divider plate 36 sealingly attached, which may be by welding, to the channel head 34 along the circumferential edge of the divider plate 36. Divider plate 36 is also sealingly attached, which may be by welding, to tubesheet 30 along the flat edge of the divider plate 36. Divider plate 36 divides the channel head 34 into an inlet plenum chamber 38 and an outlet plenum chamber 40.

Referring again to FIG. 1, disposed on the outer shell 12 below the tubesheet 30 are a first inlet nozzle 42 and a first outlet nozzle 44 in fluid communication with inlet plenum 38 and with outlet plenum chamber 40, respectively. A plurality of manway holes 46 are disposed on the outer shell 12 below the tubesheet 30 for providing access to the inlet plenum chamber 38 and outlet plenum chamber 40. Disposed on the outer shell 12 above the tube bundle 22 is a second inlet nozzle 48, which is connected to a perforated horizontal and generally toroidal feedwater ring 50 disposed in the upper portion 14 of the outer shell 12 for allowing entry of nonradioactive secondary fluid or feedwater into the upper portion 14 through inlet nozzle 48 and through the perforations (not shown) of feedwater ring 50. A second outlet nozzle 54 is disposed on top of the upper portion 14 for exit of steam from the steam generator 10.

During operation of the steam generator 10, radioactive primary fluid from the reactor, which may obtain a temperature of approximately 620° F. (327° C.) enters inlet plenum 38 through first inlet nozzle 42 and flows through the tube bundle 22 to the outlet plenum 40 where the primary fluid exits the steam generator 10 through the first outlet nozzle 44. The secondary fluid, which is water, enters the feedwater ring 50 through the second inlet nozzle 48 which is connected to the feedwater ring 50 and flows downwardly from the perforations (not shown) of the feedwater ring 50 through the annulus 21 until the secondary fluid is in fluid communication with the tubesheet 30. The secondary fluid then leaves annulus 21 flowing upwardly by natural convection through the tube bundle 22 where the secondary fluid boils and vaporizes into a steam-water mixture due to conductive heat transfer from the primary fluid to the secondary fluid through the walls of the tube bundle 22 which functions as heat conductors. The steam-water mixture flows upwardly from the tube bundle 22 and is separated by moisture separating means 18 into saturated water and dry saturated steam which may obtain a minimal quality of approximately 99.75%. The saturated water flows downwardly from the moisture separating means 18 and mixes with the secondary fluid. Thus, as the secondary fluid enters second inlet nozzle 48 dry saturated steam exits steam generator 10 through the steam outlet nozzle 54. In a manner well known in the art, the dry saturated steam is ultimately transported to perform useful work such as drive turbine generators for the production of electricity. Moreover, as previously mentioned, in a nuclear reactor, the primary fluid is radioactive; therefore, steam generator 10 is designed such that the primary fluid is nowhere in direct communication with the secondary fluid in order that the nonradioactive secondary fluid is not radioactively contaminated by intermixing with the radioactive primary fluid.

Occasionally, due to tube wall defects or tube wall cracking caused by stress and corrosion, some tubes within the tube bundle 22, for example, a suspect steam generator tube (see FIG. 2), may develop surface and volume flaws and thus may not remain leak tight. Therefore, it is customary to inspect the steam generator tubes such as tube 56 to detect the location and extent of flaws or irregularities so that corrective action may be taken, preferably before a leak develops. A determination of whether tube 56 has flaws or irregularities sufficient to require corrective action may be obtained by examining tube 56 using a nondestructive examination scanning device (not shown). Naturally, the scanning device should be suitably moved without slip or creep along the inside surface of the tube 56 so that the tube may be thoroughly scanned for flaws or irregularities.

Figure 2:
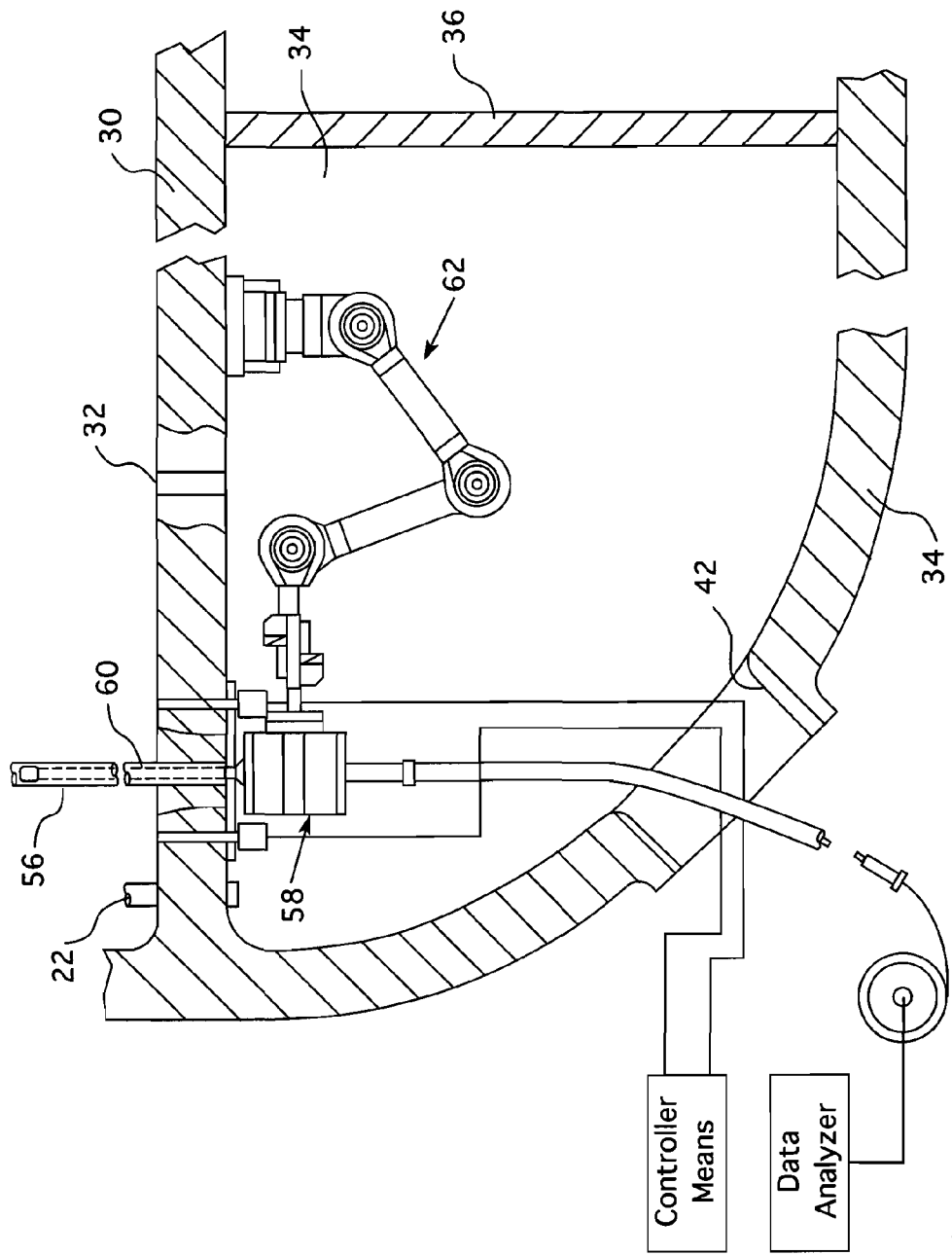
FIG. 2 illustrates a probe carrier drive assembly disposed in a plenum chamber of the steam generator beneath a steam generator tube to be inspected and releasably connected to a remote service arm for positioning the drive assembly beneath the tube to be inspected.

Referring now to FIG. 2, there is illustrated a probe carrier drive assembly, generally referred to by reference character 58, for suitably moving a probe carrier 60 in the tube 56. As previously mentioned, a robotic arm 62 supported from two or more of the tubesheet holes 32 with the aid of camlocks has been employed to support the drive assembly 58 during this process. This invention, as claimed hereafter, several embodiments of which will be described herein, provides a single simplified mechanism for supporting such a robot on the underside of the tubesheet that provides lockable anchoring with rotational stability that would require at least two of the prior art camlocks.

Figure 3:
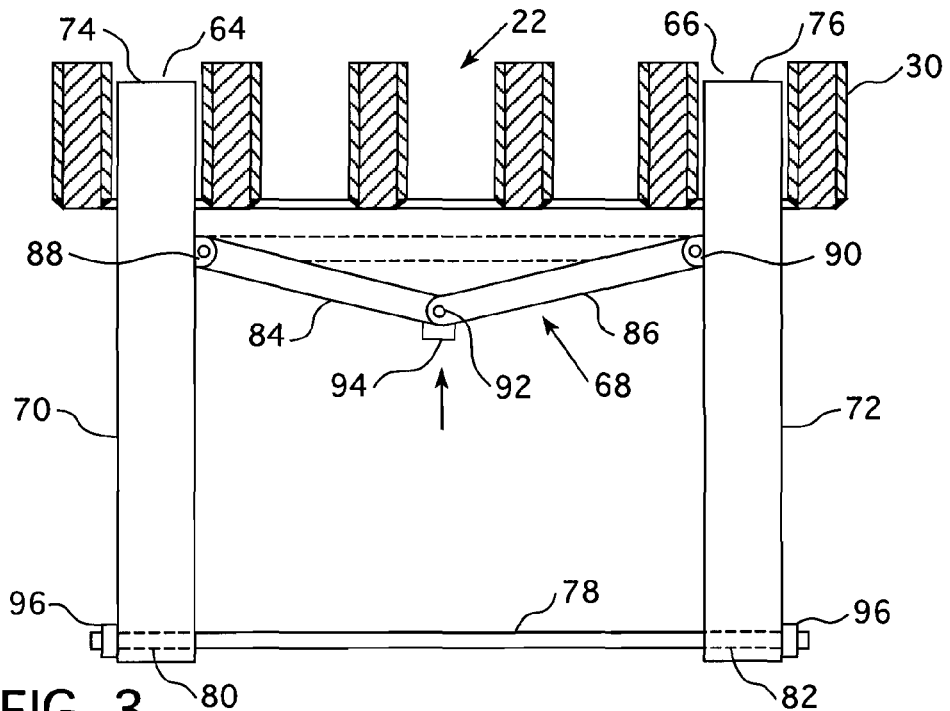
FIG. 3 is a cross sectional view of a portion of a tubesheet showing the heat exchange tube ends extending therethrough and one embodiment of the gripper of this invention for supporting a robot, such as the remote service arm illustrated in FIG. 2.

One preferred embodiment is shown in FIG. 3. Instead of engaging a single tube hole with the camlock as in the prior art, this mechanism engages two separate tube holes 64 and 66 spaced one or more pitches apart. When the linkage mechanism 68 is actuated it spreads first and second gripper fingers 70 and 72 and engages one surface of each tube 64 and 66 (or corresponding hole where the tubes do not fully penetrate the hole) inside diameter. Due to the geometry, the finger engagement will align the mechanism with the two holes, 64 and 66, thereby providing a fixed rotational reference, and will provide an anchoring force by way of friction with the tube inside diameter surface. The linkage mechanism 68 provides a significant mechanical advantage such that the engagement force is much larger than the actuation force, and with proper dimensioning and compliance, the linkage will toggle into a locked position such that the mechanism will stay gripped even after the actuation force is removed. As can be seen in FIG. 3, the fingers 70 and 72 have a first end 74 and 76 that are inserted at least partially within the tubesheet openings of heat exchange tubes 64 and 66. The distal ends of the fingers 70 and 72 are restrained against laterally moving outward by a tie bar or rod 78 which extends through an opening 80 and 82, respectively, in the distal ends of the fingers 70 and 72 and is captured by an enlarged end or nut 96 at either end. Preferably, the tie rod loosely fits through the openings 80 and 82 or the tie bar or rods 78 is flexible so that the fingers 70 and 72 can cant (slant) against the side walls of the openings in the tubes 64 and 66 when the actuation arm 68 is activated to the horizontal position in which it is locked. The robotic arm 62 that supports the tool (shown in FIG. 2) can be supported from either finger 70, 72 or the tie rod 78.

The actuation arm is mainly formed by the two links 84 and 86 which are connected at the center by a pivot pin 92 and at the ends by pivot brackets 88 and 90. An actuation grip 94 is provided that can be accessed using a remote tool, such as a pole, which is manipulated from outside of one of the manways 46.

Figure 4:
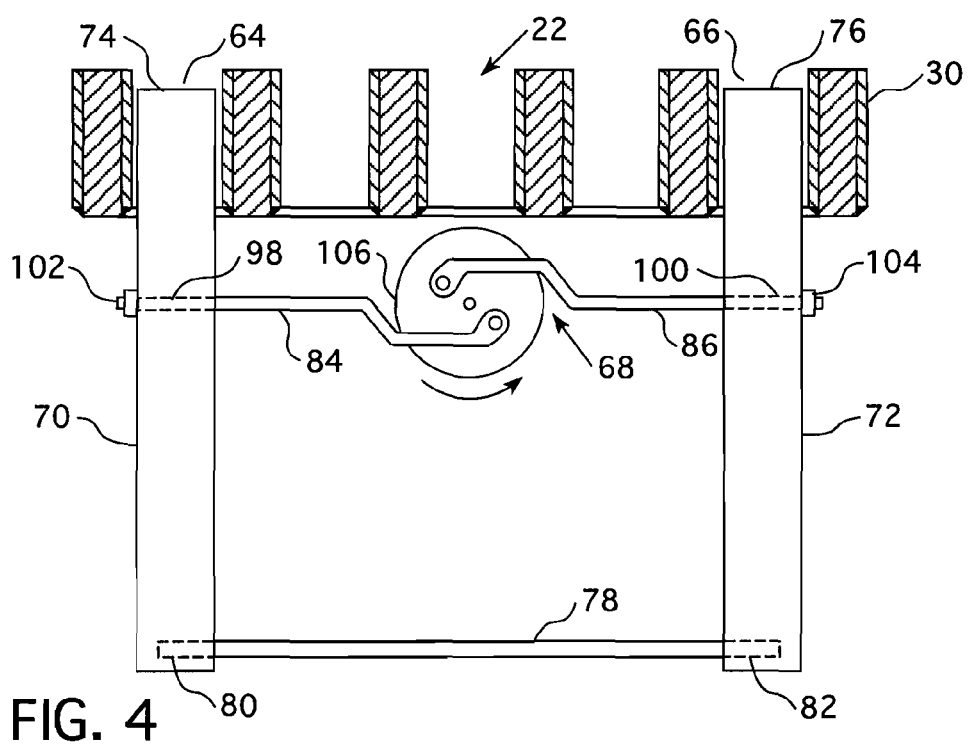
FIG. 4 is a cross sectional view of the portion of the tubesheet shown in FIG. 1 with a second embodiment of the gripper of this invention shown inserted within two of the heat exchange tube ends.

FIG. 4 shows an alternate embodiment in which the actuation linkages 84, 86 of the actuation arm 68 are arranged as tension members. As explained with regard to FIG. 3, the mechanism is self-aligning with the holes, has significant mechanical advantage in gripping force, and is capable of toggling into a locked state. Like reference characters are used to identify corresponding components among the various figures. In this embodiment, the ends of the tie rods 78 are screwed into openings 80 and 82 in the distal ends of the fingers 70 and 72. The linkages 84 and 86 on the actuation arm 68 extend through openings 98, 100, respectively, in the fingers 70 and 72. The distal ends of the linkages 84 and 86 are captured by nuts 102, 104 on the other side of the openings 98 and 100. Thus, when the actuation disk 106 is rotated in the counterclockwise direction, the linkages 84 and 86 will be placed in tension drawing the fingers 70 and 72 towards each other and bracing the distal ends 74 and 76 against the inner walls of the tube openings 64 and 66. It should be appreciated that a similar result could be obtained by attaching the distal ends of the linkages 84 and 86 directly to the inside surfaces of the fingers 70 and 72 as was done in the embodiment illustrated in FIG. 3 and the actuation disk rotated in a clockwise direction to place the linkages 84 and 86 in compression and cant the ends 74 and 76 of the fingers 70 and 72 outward against the walls of the openings 64 and 66.

Figure 5:
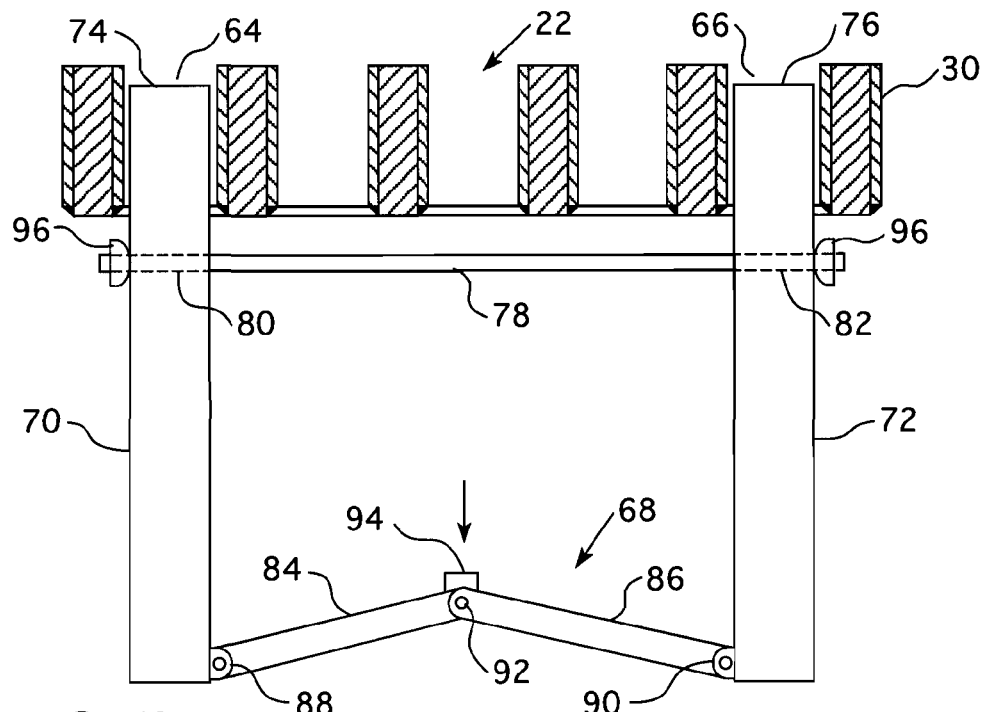
FIG. 5 is a cross section of the portion of the tubesheet shown in FIGS. 3 and 4 with a third embodiment of the gripper of this invention shown disposed within two of the heat exchange tube ends.
Figure 6:
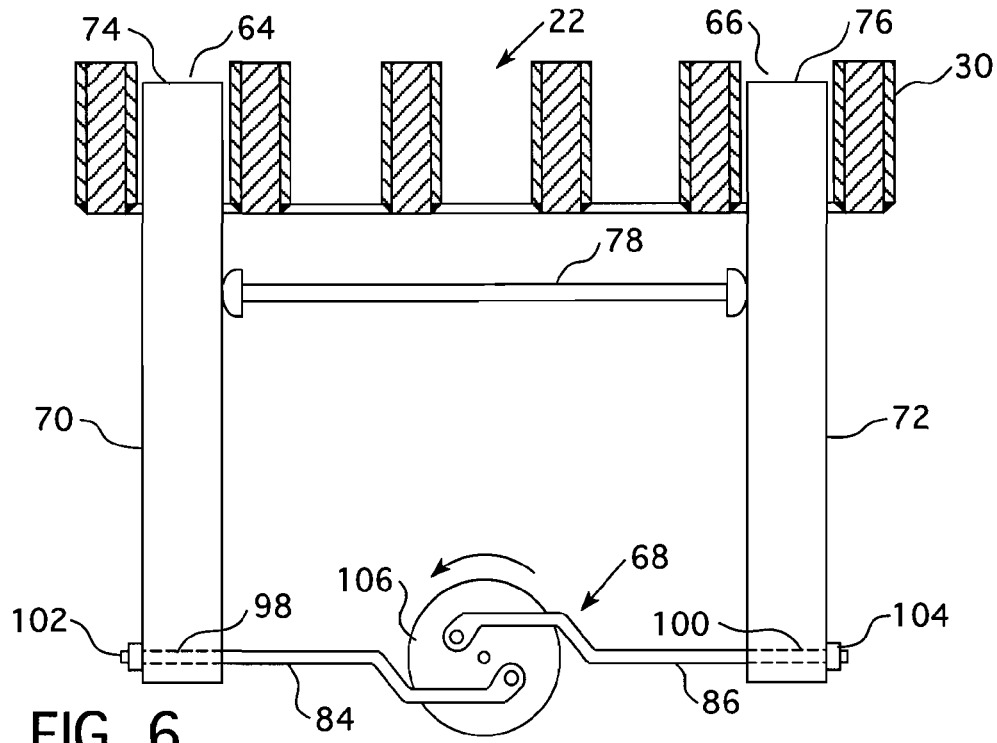
FIG. 6 is a cross sectional view of the portion of the tubesheet shown in FIGS. 3, 4 and 5 with a fourth embodiment of the gripper of this invention shown disposed within two of the heat exchange tube ends.

FIGS. 5 and 6 show other embodiments in which the fulcrum (tie rod 78) is moved to the upper position and the fingers 70 and 72 are operated as levers from actuation linkages 84, 86 at the bottom or distal ends of the fingers, arranged as either compression or tension members. As before, the mechanism is self-aligning with the tube holes, has a significant mechanical advantage in applying the gripping force, and is capable of toggling into a locked state.

It should be appreciated that a variety of support structures can house this mechanism and be supported from the tubesheet to perform any number of mechanical tasks such as inspecting the heat exchange tubes, plugging the ends of the tubes, rolling the ends of the tubes, welding tube sections, etc. In addition, if the connections to the fingers 70, 72 are slotted it will be possible to slide the fingers vertically into and out of the tubesheet when the mechanism is not actively gripped, thus providing a way to disengage the mechanism from the tubesheet, i.e., one or both of the tie rod and the actuation arm being connected to the fingers loosely through slots. An example of the latter arrangement is shown in FIG. 7.

Figure 7:
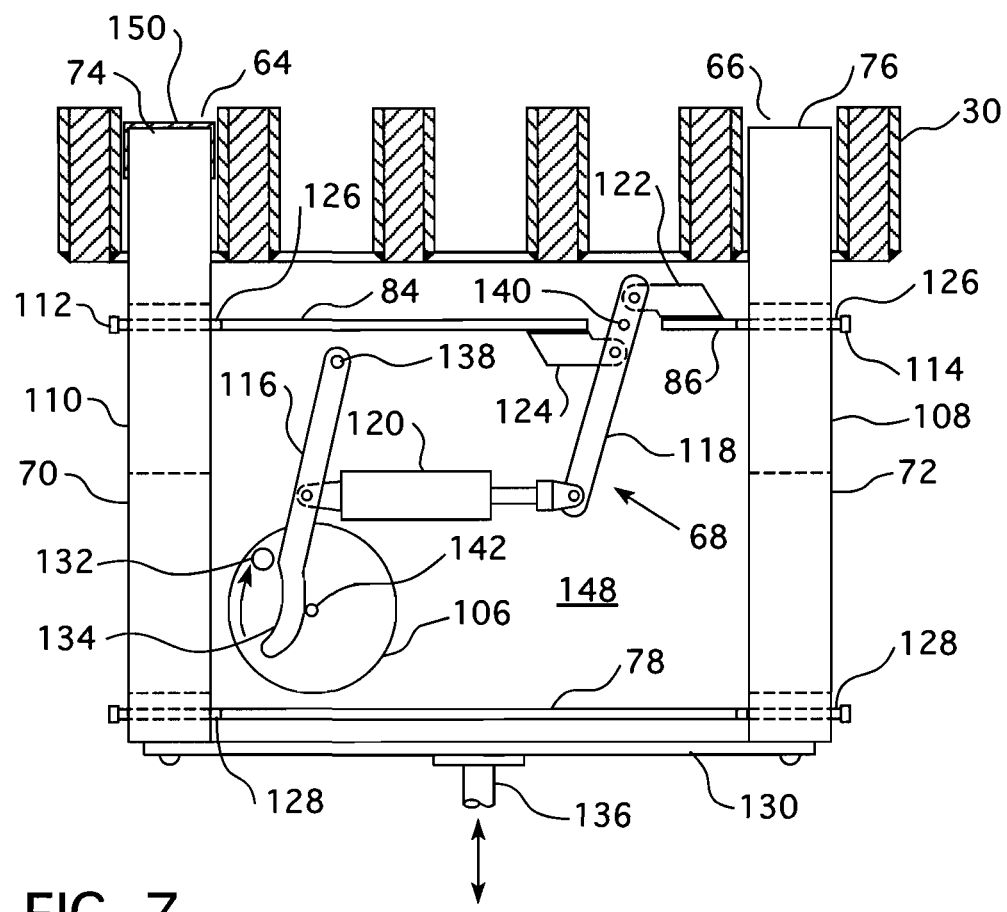
FIG. 7 is a cross sectional view of the portion of the tubesheet shown in FIGS. 3, 4, 5 and 6 with a fifth embodiment of the gripper of this invention shown disposed within two of the heat exchange tube ends.

FIG. 7 shows still another embodiment of this invention that includes two additional features not included in the above embodiments. The first additional feature provides clearance slots 108, and 110, respectively in the fingers 72 and 70, that permit the fingers to move vertically, relative to one or both of the tie rod 78 and the actuation links 84 and 86, into or out of the tubesheet 30. This enables the tie rod 78 and/or the activation linkages 84, 86, to be separately supported while the fingers move into the tubes in the tubesheet 30 prior to gripping or out of the tubesheet after gripping. The second feature includes an air spring 120 between the primary cam lever 116 and the clamping lever 118 to accommodate dimensional variations.

In the embodiment shown in FIG. 7 the two fingers 70 and 72 can be lifted into the tubesheet 30 using the common bar 130, while the tie rod 78 and actuation links 84 and 86 are separately supported, such as by a robot 62. The fingers 70 and 72 can be moved vertically by a pneumatic or hydraulic cylinder 136. As the fingers 70 and 72 are raised or lowered, the slots 110 and 108 move over the actuation linkages 84 and 86, respectively. The linkages 84 and 86 are provided with notches 126 which are captured within the slots 110 and 108 by the enlarged ends 112 and 114 of the linkages 84 and 86, i.e., as compared to the notches 126. Similarly the tie rod 78 may ride in similar slots, though it is not necessary unless the tie rod 78 and the linkages 84 and 86 are supported together, for example by the back plate 148. Alternately, the actuation linkages 84 and 86 can be provided with openings in their ends through which notches in the finger pass and move vertically in a similar manner. Alternately, in this latter embodiment, the actuation linkages 84 and 86 can be flat bars with clearance holes towards the peripheral ends of the bars for the passage of the fingers. In this embodiment the lower tie rod 78 is optional as the common lift bar 130, used to raise and lower the fingers, may also be used to restrain the bottom of the fingers.

The actuation mechanism 68 comprises a cam and a series of interconnected actuation linkages. The actuation linkages 116 and 118 are connected to the back plate 148 respectively with pivot couplings 138 and 140 and the cam is connected to the back plate 148 with rotatable coupling 142. A pin 132 protrudes from the surface of the cam and rides against the curve surface of the hook 134 at the lower end of the actuation linkage 116, over at least of portion of the travel of the cam. The actuation linkage 116 is connected to one end of the actuation link 118 through an air spring 120 which is pivotally connected at its ends respectively to an intermediate segment of actuation link 116 and one end of actuation link 118. Actuation link 84 is pivotally coupled to an intermediate segment of actuation link 118 through bracket 124 which is rigidly attached to actuation link 84. Similarly actuation link 86 is pivotally coupled to an end portion of actuation link 118 through bracket 122 which is rigidly connected to actuation link 86. Once the fingers are in the up position inside the appropriate tubesheet tubes, rotating the cam pushes the actuation linkage lever 116 to compress the air spring 120, in turn moving the actuation link clamp lever 118 to inwardly tilt the ends 74 and 76 of the fingers 70 and 72 to engage the side walls of the tubesheet tubes 64 and 66. As the cam 106 continues motion in a clockwise direction it compresses the air spring 120 thus providing the clamping action. The cam 106 rotation continues until it reaches the curved hook 134 on the actuation lever arm 116 at which point the geometry causes a detent to occur (i.e., the cam cannot be back driven by the air spring). The use of the air spring 120 allows the clamping mechanism to accommodate small dimensional variations in the tube spacing while achieving a nearly constant clamping force.

It should be appreciated that the fingers need not have a round cross-section and two contact points provide better self-alignment with the tubesheet openings. In addition, the tips of the fingers 70, 72 may be provided with elastomeric sheaths 150 (shown in FIG. 7) to protect the heat exchange tubes.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A tool having an actuator for gripping a tubesheet of a heat exchanger having a plurality of heat exchange tubes extending at least partially through thru-holes in the tubesheet, each of the heat exchange tubes having a central axis extending along a length thereof, the actuator comprising:
   a first elongated finger sized to have a first end of the first elongated finger inserted at least partially within a first of the thru-holes within the tubesheet;
   a second elongated finger sized to have a first end of the second elongated finger inserted at least partially within a second of the thru-holes in the tubesheet, the second elongated finger being spaced from the first elongated finger to substantially align with the second of the thru-holes when the first elongated finger is substantially aligned with the first of the thru-holes;
   a tie rod connected between the first elongated finger and the second elongated finger at a first elevation along the first elongated finger and the second elongated finger that is spaced from the first ends, the connection of the tie rod between the first elongated finger and the second elongated finger being configured to restrain movement at the first elevation of the first elongated finger and the second elongated finger in at least a first of two lateral directions, either toward each other or away from each other; and
   an actuation arm connected between the first elongated finger and the second elongated finger at a second elevation along the first elongated finger and the second elongated finger that is spaced from the first elevation and spaced from the first ends, the connection of the actuation arm between the first elongated finger and the second elongated finger being configured to move the first elongated finger in at least one of the two lateral directions and cant at least one of the first elongated finger and the second elongated finger relative to the axis of a corresponding tube or thru-hole in which it is designed to be inserted to pressure the one of the first elongated finger and the second elongated finger against an inner wall of the corresponding tube or thru-hole and hold that position until the actuation arm is positively released.

2. The tool of claim 1 wherein the actuation arm cants both the first elongated finger and the second elongated finger relative to the axis of the corresponding tube or thru-hole in which it is designed to be inserted to pressure the first elongated finger and the second elongated finger against the corresponding tube in which it is inserted.

3. The tool of claim 1 wherein the actuation arm toggles between a locked position in which the at least one of the first elongated finger and the second elongated finger is canted relative to the axis of the corresponding tube or thru-hole in which it is designed to be inserted and an unlocked position in which the first elongated finger and the second elongated finger are not pressured against the inner wall of the corresponding tube or thru-hole.

4. The tool of claim 1 wherein both the first elongated finger and the second elongated finger are pressured against the inner wall of the corresponding tube or thru-hole when the actuation arm moves in the at least one of the two lateral directions.

5. The tool of claim 1 wherein the first elevation is between the first ends and the second elevation.

6. The tool of claim 5 wherein the tie rod restrains movement of the first elongated finger and the second elongated finger towards each other.

7. The tool of claim 1 wherein the tie rod restrains movement of the first elongated finger and the second elongated finger away from each other.

8. The tool of claim 1 wherein the second elevation is between the first ends and the first elevation.

9. The tool of claim 8 wherein the tie rod restrains movement of the first elongated finger and the second elongated finger towards each other.

10. The tool of claim 8 wherein the tie rod restrains movement of the first elongated finger and the second elongated finger away from each other.

11. The tool of claim 1 wherein the first elongated finger and the second elongated finger are configured to move a distance vertically independent of the actuation arm.

12. The tool of claim 1 wherein the actuation arm includes a compensator that is configured to accommodate a variation in spacing of the thru-holes while maintaining an approximately constant clamping force.

13. The tool of claim 12 wherein the compensator is an air spring.

14. The tool of claim 1 wherein a portion of the first end of either or both the first elongated finger and second elongated finger have a noncircular cross-section.

15. The tool of claim 1 including a resilient sheath over a portion of the first end of either or both the first elongated finger and second elongated finger.

16. The tool of claim 15 wherein the sheath is formed from an elastomeric material.

17. A method of supporting a tool from an underside of a heat exchange tubesheet having a plurality of openings extending through the underside comprising the steps of:
   inserting a portion of a first finger into a first opening in the underside of the tubesheet;
   inserting a portion of a second finger into a second opening in the underside of the tubesheet;
   leveraging the first finger off the second finger to clamp at least a part of the portion of either the first finger or the second finger that is inserted into the corresponding opening against a wall of the opening; and
   locking the first finger and the second finger in their clamped position.

18. The method of claim 17 wherein the leveraging step clamps both the first finger and the second finger against the wall of the corresponding opening.

19. The method of claim 17 wherein the leveraging step cants either the first finger or the second finger relative to an axis of the corresponding opening in which it is inserted.

20. The method of claim 19 wherein the leveraging step cants both the first finger and the second finger relative to the axis of the corresponding opening in which it is inserted to clamp the first finger and the second finger against the wall of the corresponding opening.

21. The method of claim 17 including the step of suspending the tool from the first and second fingers.

22. The method of claim 17 including the step of moving the first finger and the second finger in a vertical direction independent of a mechanism for performing the leveraging step.

23. The method of claim 17 including the step of compensating for a variation in a distance between openings in the underside of the tubesheet while substantially maintaining a constant clamping force.

* * * * *